Jan. 7, 1941.  C. D. MORTON  2,227,735
LOCK PIN FOR FIXED DENTAL BRIDGEWORK
Filed March 25, 1939
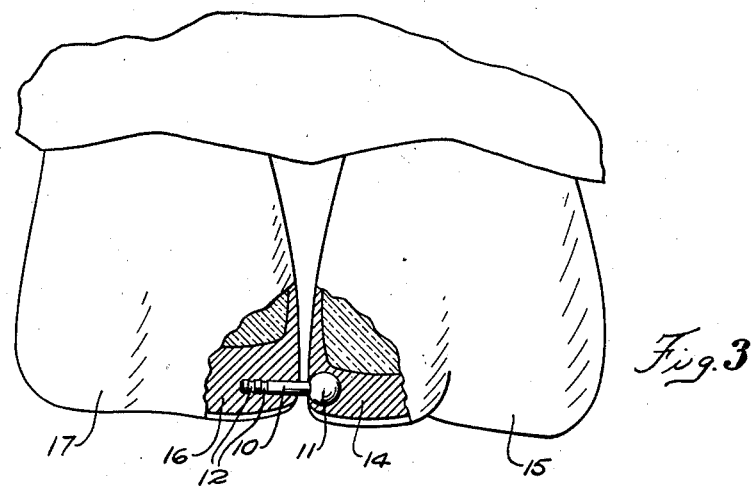
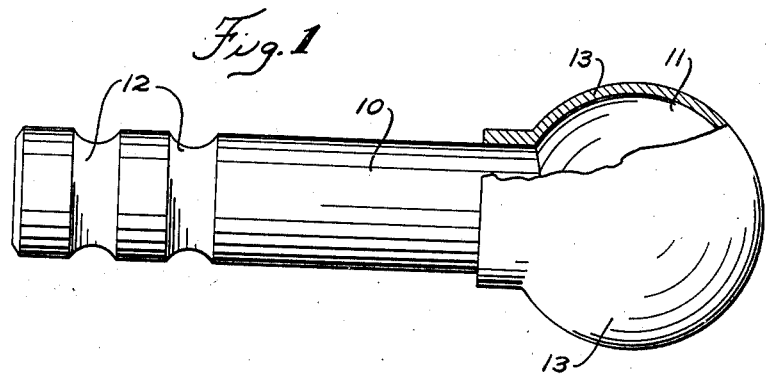
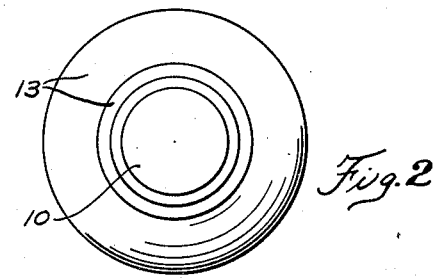
Inventor
Charles Dale Morton,
By Minturn & Minturn,
Attorneys Patented Jan. 7, 1941

2,227,735

UNITED STATES PATENT OFFICE 2,227,735

LOCK PIN FOR FIXED DENTAL BRIDGEWORK

Charles Dale Morton, Greenfield, Ind.

Application March 25, 1939, Serial No. 264,059

2 Claims. (Cl. 32—6)

This invention relates to the art of dental bridgework and specifically to a pin to be employed between an anchor tooth and the bridge.

Reference is made to my U. S. Letters Patent No. 2,129,861, issued September 13, 1938, and also to my pending application for U. S. Letters Patent, Serial No. 199,127, filed March 31, 1938, both relating to bridge construction involving the use of a lock pin to give an articulating connection between an anchor tooth and the bridge.

A primary object of the present invention is to provide a lock pin initially formed and coated to be ready for use by the operator without further preparatory work on the pin and to provide the operator with a pin that, without further preparation, will insure a definite predetermined clearance between the pin head and its socket. This definite clearance is extremely important. It is to be understood that the pin is employed, as above indicated, to provide for an articulated connection. If there is too little clearance the parts will bind and the bridge may as well be rigidly united with the anchor tooth cap. On the other hand, if the clearance is too great, the bridge will float to such an extent that replacement will be required.

A further important object of the invention is to provide a lock pin which will not only have one end formed and coated with a clearance film but will have the other end formed with one or more shoulders at least as retention means usable either in casting or soldering processes.

The invention will be better understood by referring to the above indicated patent and pending application, both of which describe methods and structures within which the lock pin of this invention is employed.

Reference is made to the accompanying drawing, in which

Fig. 1 illustrates on a greatly enlarged scale one particular form of a pin embodying the invention;

Fig. 2, an end elevation; and

Fig. 3, a side elevation in partial section showing the pin as used.

Like characters of reference indicate like parts in the several views of the drawing.

While there are several permissible procedures, the following method will be sufficient to illustrate the general use of the pin. Reference is made first to Fig. 1 wherein the pin is illustrated on a greatly enlarged scale. The pin is provided with a generally cylindrical shank 10 on one end of which is formed a ball head 11. The shank 10 is provided with one or more retention grooves 12, herein shown as two in number, these grooves passing entirely around the shank. The head 11 is coated with a suitable mixture that may be applied evenly and that will harden sufficiently to permit that coating to form a cavity in a mold, and that will further remain unaffected as to thickness by the temperatures of molten metal cast around the head and its coating, and also may be dissolved by some suitable solvent after the casting operation so that the coating material may be washed out to leave a clearance between the head and the cast metal surrounding it to permit rocking of the head within the cavity thus formed. The coating material must further possess that property of adhering tightly to the metal pin without chipping or rubbing off so that the pin may be shipped and handled without disturbing the film.

One particular coating material which I have found to be suitable is a cellulose or resinous lacquer obtainable at present on the market in a liquid state as a common brushing or spraying clear lacquer, sold by the E. I. du Pont de Nemours & Company, Inc., under the name of "Pyroxylin Primer-Surfacer High Speed," used generally for undercoating on metals, etc. This material is initially quite viscous and I thin it with commercial lacquer thinner to the viscosity below indicated. Carbon or lamp black is mixed with it for rendering the material opaque and also to provide additional anti-flux properties. The head 11 of the pin is dipped into this lacquer to allow the lacquer to flow up on the shank 10 the desired distance equal to the clearance or space to be desired between the bridge and the anchor tooth cap or attachment. By controlling the viscosity of the lacquer, the film of the lacquer left upon the head and the shank 10 upon lifting of the pin from the lacquer may be controlled to give a very definite thickness. The lacquer, to which reference has just been made, has a specific gravity of 1.060. By varying this specific gravity and the temperature, this film, of course, may be made to vary in thickness. A minimum thickness is desired in order to provide the correct degree of clearance. I am having very excellent results by holding this thickness of film to approximately .034–.035 of a millimeter. The evenness of coating may be provided by placing the shank 10 of the pin in some device for spinning the pin about its axis, dipping the pin into the lacquer, pulling the pin out, and spinning it as it is pulled out and continuing spinning until dry. In one particular spinning device, the pin is turned at approximately 1250 R. P. M. This spinning of the pin will, of course, facilitate drying of the coating to hardness.

Now going back to the description of the one method employing a pin of this type, the usual preliminary steps of forming the impression are taken by the operator and matrices are formed upon which casting wax is built up to the desired thickness; dummy teeth selected; and their anchors embedded in the wax. The shank 10 of the pin is pressed into the wax of either that part which will form the attachment of the anchor tooth or that part which will form the bridge. It is immaterial in general which way the pin is turned. That is, the articulating connection may be either in the anchor tooth attachment or in the bridge itself. In the present description, it will be assumed that the articulating joint is in the anchor tooth attachment. In this case the shank 10 will be inserted into the wax forming the pattern for the bridge. The head 11 will be embedded in the wax which forms the pattern for the anchor tooth. The pattern thus produced consisting of the two matrices interconnected by the pin as embedded in the wax parts is invested in a suitable molding material; the wax burned out; and the mold is cast with suitable material, such as gold which flows in to take the place of the removed wax to envelop the head 11 on the one side and the shank 10 on the other side. The coating of the film 13 on the head 11 will, of course, determine the size and shape of the cavity formed within the poured gold. The gold on the other side will flow about the shoulders of the grooves 12 so that regardless of whether or not the gold is bonded to the shank 10, the shank is anchored by reason of the engagement of the gold with those shoulders so that the shank may not be withdrawn axially.

The casting is removed from the mold and a lacquer solvent is applied to the ball end of the pin, this solvent, being any one of the well known compounds such as ether, will dissolve the lacquer so that it and the lampblack or carbon may be washed out to leave the clearance between the head 11 and the metal cast about it, this clearance being equal to the thickness of the film 13.

The casting is then applied to the patient's mouth and will assume some such form as indicated in Fig. 3 where the attachment 14 is applied to the anchor tooth 15 with the head 11 rockably embedded therein to have the shank 10 extending into the bridge casting 16 which carries the dummy tooth 17. It is to be noted that the head 11 is positioned within the attachment 14 to be just embedded therein so that there may be oscillatory movement within the desired range without undue limitation therein by the shank 10. This permits movement of one tooth in relation to the other so as to prevent breaking of the bridge or cement retaining it under stress and strain set up when the bridge is in use. As above indicated, this clearance between the head and the wall of the cavity in the attachment 14 must be limited to that which will restrain relative movement to such an extent that loosening of the bridge attachment is prevented.

Of course, the shank 10 may be soldered into the bridge in place of being cast but solder may not be applied about the coated head 11. In any event, the film 13 still serves as the spacing and clearance means in casting, to be later removed. The pin may be employed in various methods of casting procedure, and also in various methods of impression taking, including use of hydrocolloids with their particular die materials. The pin being a separate unit, the operator, following preparation of the teeth, and taking of impressions and bite, may construct all of the bridgework outside of the patient's mouth without necessity of the patient being present. The casting procedure may comprise casting in multiple units one joined to the other by use of the pins, or a single casting over one part of the pin to be reinvested and a second casting formed to engage the other part of the pin where no spacing is desired between adjacent teeth.

While I have herein shown and described my invention in the one particular form, it is obvious that structural changes may be employed without departing from the spirit of the invention, such changes for example being in the composition of the clearance film and also in the conformation of the retentive means on the pin shank, and I, therefore, do not desire to be limited to that precise form beyond the limitations as may be imposed by the following claims.

I claim:

1. For bridgework, a lock pin formed to have a head, a shank, retentive means on the shank, and a heat resistant, removable, anti-flux film of fixed thickness enveloping and adhering to the head.

2. For bridgework, a lock pin formed to have a head, a shank, retentive means on the shank, and a heat resistant, removable, anti-flux film of fixed thickness enveloping and adhering to the head, said film consisting of a solidified plastic or lacquer of the group embodying cellulose, natural resins, and synthetic resin lacquers, plus lampblack.

CHARLES DALE MORTON.